US012338897B2

(12) United States Patent
Stevenheydens et al.

(10) Patent No.: US 12,338,897 B2
(45) Date of Patent: Jun. 24, 2025

(54) ENERGIZING ELEMENT AND METHODS OF MAKING AND USING THE SAME

(71) Applicant: SAINT-GOBAIN PERFORMANCE PLASTICS CORPORATION, Solon, OH (US)

(72) Inventors: Gino L. Stevenheydens, Willebroek (BE); Peter Aerts, Ruisbroek (BE); Shabarish Nunna, Antwerp (BE); Herman M. Dubois, Duffel (BE)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 18/319,815

(22) Filed: May 18, 2023

(65) Prior Publication Data

US 2023/0375088 A1 Nov. 23, 2023

Related U.S. Application Data

(60) Provisional application No. 63/364,963, filed on May 19, 2022.

(51) Int. Cl.
*F16J 15/32* (2016.01)
*F16J 15/3212* (2016.01)
*F16J 15/3236* (2016.01)

(52) U.S. Cl.
CPC ....... *F16J 15/3212* (2013.01); *F16J 15/3236* (2013.01)

(58) Field of Classification Search
CPC ... F16J 15/3212; F16J 15/3236; F16J 15/3208
See application file for complete search history.

(56) References Cited

U.S. PATENT DOCUMENTS

| 1,924,555 A | 8/1933 | Hubbard |
| 2,342,458 A * | 2/1944 | Davies ................. F16J 15/3212 562/56 |

(Continued)

FOREIGN PATENT DOCUMENTS

| CN | 102481681 B | 7/2014 |
| CN | 104565151 A | 4/2015 |

(Continued)

OTHER PUBLICATIONS

International Search Report and Written Opinion for PCT Application No. PCT/US2023/022710, mailed Sep. 8, 2023, 12 pages.

(Continued)

*Primary Examiner* — Eugene G Byrd
*Assistant Examiner* — L. Susmitha Koneru
(74) *Attorney, Agent, or Firm* — Abel Schillinger, LLP; Ann Palma

(57) ABSTRACT

An energizing element including: an energizing element body including an annular filament oriented about a central axis, the annular filament including a plurality of oscillations generally directed down the central axis, where at least one oscillation includes an internal circumferential void having a first circumferential width, $W_{FV}$, and a second circumferential width, $W_{SV}$, located at a different axial position along the oscillation, and where $W_{FV} \neq W_{SV}$.

19 Claims, 11 Drawing Sheets

(56) References Cited

U.S. PATENT DOCUMENTS

| | | | | |
|---|---|---|---|---|
| 2,434,484 | A | * | 1/1948 | Chambers, Jr. ...... F16J 15/3212 277/553 |
| 4,133,542 | A | * | 1/1979 | Janian ................... F16J 15/3212 277/555 |
| 4,173,878 | A | | 11/1979 | Nemets et al. |
| 4,508,356 | A | * | 4/1985 | Janian .................... F16J 15/328 267/1.5 |
| 6,098,989 | A | * | 8/2000 | Caplain ................ F16J 15/0887 277/910 |
| 9,010,740 | B2 | | 4/2015 | Jaster |
| 9,182,041 | B2 | * | 11/2015 | Daub ................... F16J 15/3212 |
| 9,341,223 | B2 | | 5/2016 | Suzuki et al. |
| 10,535,945 | B2 | | 1/2020 | Dilmaghanian et al. |
| 10,598,241 | B2 | | 3/2020 | Poon et al. |
| 10,605,367 | B2 | | 3/2020 | Tokunaga |
| 10,737,310 | B2 | * | 8/2020 | Watanabe .............. B21D 28/02 |
| 11,802,646 | B2 | * | 10/2023 | Furcoiu ................. F16L 55/163 |
| 2009/0243225 | A1 | | 10/2009 | Matsushima et al. |
| 2010/0110840 | A1 | | 5/2010 | Zaugg et al. |
| 2013/0043660 | A1 | * | 2/2013 | Daub ................... H01M 50/213 29/527.1 |
| 2015/0316115 | A1 | | 11/2015 | Carter |
| 2016/0319936 | A1 | | 11/2016 | Dubois |
| 2018/0266562 | A1 | | 9/2018 | Balsells |
| 2018/0327919 | A1 | | 11/2018 | Kim et al. |
| 2018/0335145 | A1 | * | 11/2018 | Tokunaga ............ F16J 15/3212 |
| 2018/0354017 | A1 | * | 12/2018 | Watanabe .............. B21D 28/02 |
| 2021/0041052 | A1 | * | 2/2021 | Furcoiu .................. F16J 15/028 |
| 2023/0027214 | A1 | | 1/2023 | Zlebek et al. |
| 2024/0384792 | A1 | | 11/2024 | Lebrun et al. |

FOREIGN PATENT DOCUMENTS

| | | |
|---|---|---|
| CN | 105202089 A | 12/2015 |
| CN | 106392473 A | 2/2017 |
| CN | 206190907 U | 5/2017 |
| CN | 206694480 U | 12/2017 |
| CN | 110121407 A | 8/2019 |
| CN | 110594327 A | 12/2019 |
| CN | 108561553 B | 6/2020 |
| EP | 2559922 A1 | 2/2013 |
| EP | 3217046 A1 | 9/2017 |
| JP | 721968 Y2 | 5/1995 |
| JP | 2002212770 A | 7/2002 |
| JP | 2009002309 A | 1/2009 |
| JP | 6216805 B2 | 10/2017 |
| JP | 6471001 B2 | 2/2019 |
| KR | 101461373 B1 | 11/2014 |
| WO | 2008155864 A1 | 12/2008 |
| WO | 2011072192 A2 | 6/2011 |
| WO | 2023225179 A1 | 11/2023 |
| WO | 2024238954 A1 | 11/2024 |

OTHER PUBLICATIONS

International Search Report and Written Opinion for PCT Application No. PCT/US2024/030013, mailed Sep. 6, 2024, 12 pages.

* cited by examiner

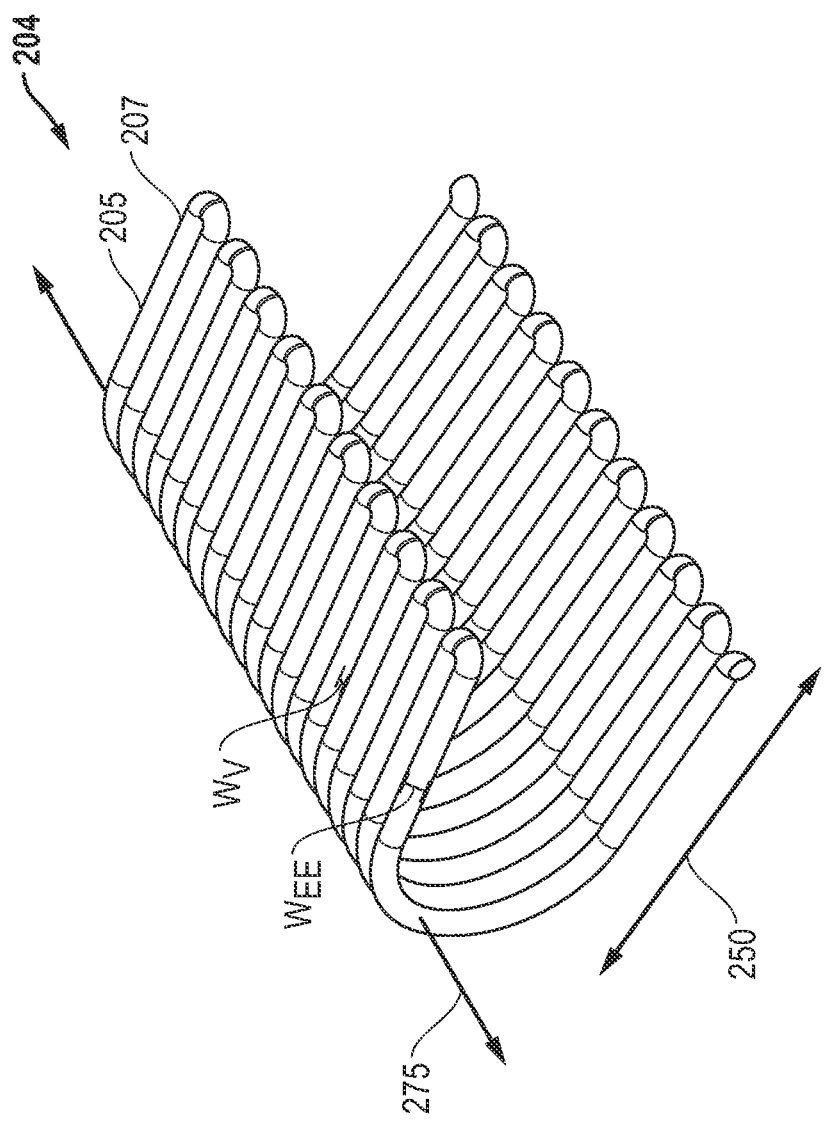
FIG. 2A1

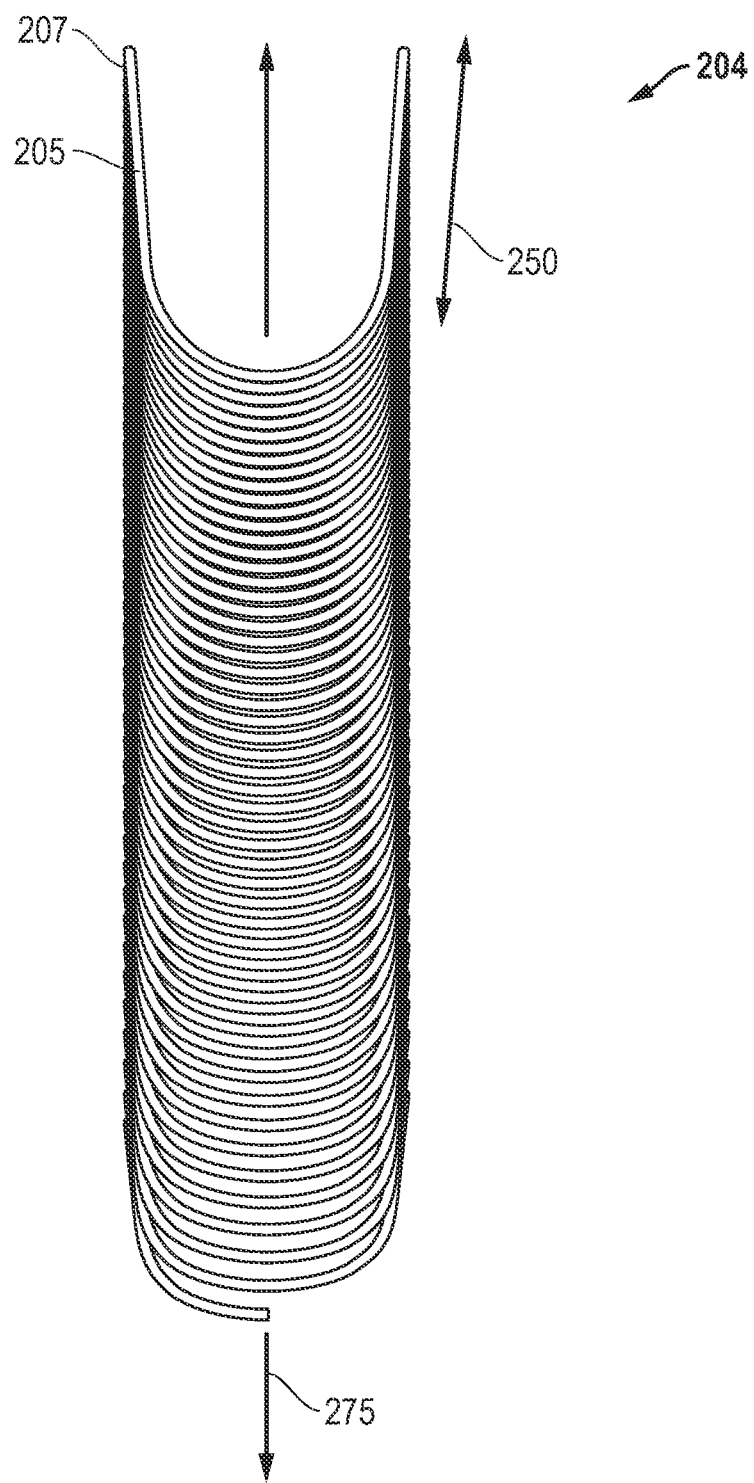
FIG. 2A2

ENERGIZING ELEMENT AND METHODS OF MAKING AND USING THE SAME

CROSS-REFERENCE TO RELATED APPLICATION(S)

This application claims priority under 35 U.S.C. § 119(e) to U.S. Provisional Application No. 63/364,963, entitled "ENERGIZING ELEMENT AND METHODS OF MAKING AND USING THE SAME," by Gino L. STEVENHEYDENS et al., filed May 19, 2022, which is assigned to the current assignee hereof and incorporated herein by reference in its entirety.

FIELD OF THE DISCLOSURE

The present disclosure relates to energizing elements, and more particularly to energizing elements used in seals.

RELATED ART

Energizing elements (e.g. energizing elements) are used in a plurality of applications to provide appropriate loads on neighboring components including, but not limiting to seals applications. Seals are employed in environments to segregate fluids (liquids, gases, slurries, etc.) from one another. Under pressure conditions, current energizing elements may lack design customization and flexibility in desired load ranges and under desired conditions in applications such as seals. Therefore, the industry continues to demand improved energizing elements for desired conditions and applications.

SUMMARY

Embodiments herein may include an energizing element including: an energizing element body including an annular filament oriented about a central axis, the annular filament including a plurality of oscillations generally directed down the central axis, where at least one oscillation includes an internal circumferential void having a first circumferential width, $W_{FV}$, and a second circumferential width, $W_{SV}$, located at a different axial position along the oscillation, and where $W_{FV} \neq W_{SV}$.

Embodiments herein may include an energizing element including: an energizing element body including an annular filament oriented about a central axis, the annular filament including a plurality of oscillations generally directed down the central axis, where the plurality of oscillations include a first oscillation from a center point having a filament length, $L_{FF}$, and a circumferentially neighboring second oscillation from the center point having a filament length, $L_{SF}$, and where $L_{FF} \neq L_{SF}$.

Embodiments herein may include an energizing element including: an energizing element body including an annular filament oriented about a central axis, the annular filament including a plurality of oscillations generally directed down the central axis, where the plurality of oscillations include a plurality of exterior oscillations from a center point, and a plurality of interior oscillations from the center point, where the number of exterior oscillations is greater than the number of interior oscillations.

Embodiments herein may include an energizing element including: an energizing element body including an annular filament oriented about a central axis, the annular filament including a plurality of oscillations generally directed down the central axis, where the plurality of oscillations include an exterior oscillation from a center point, and an interior oscillation from the center point, where the exterior oscillation is connected to the interior oscillation across the center point by an arcuate portion spanning a circumferential distance wider than a circumferential width of the annular filament.

Embodiments herein may include a seal including: an annular jacket including a body defining an annular recess; and an energizing element disposed within the recess, the energizing element including: an energizing element body including an annular filament oriented about a central axis, the annular filament including a plurality of oscillations generally directed down the central axis, where at least one oscillation includes an internal circumferential void having a first circumferential width, $W_{FV}$, and a second circumferential width, $W_{SV}$, located at a different axial position along the oscillation, and where $W_{FV} \neq W_{SV}$.

Embodiments herein may include a seal including: an annular jacket including a body defining an annular recess; and an energizing element disposed within the recess, the energizing element including: an energizing element body including an annular filament oriented about a central axis, the annular filament including a plurality of oscillations generally directed down the central axis, where the plurality of oscillations include a first oscillation from a center point having a filament length, $L_{FF}$, and a circumferentially neighboring second oscillation from the center point having a filament length, $L_{SF}$, where $L_{FF} \neq L_{SF}$.

Embodiments herein may include a seal including: an annular jacket including a body defining an annular recess; and an energizing element disposed within the recess, the energizing element including: an energizing element body including an annular filament oriented about a central axis, the annular filament including a plurality of oscillations generally directed down the central axis, where the plurality of oscillations include a plurality of exterior oscillations from a center point, and a plurality of interior oscillations from the center point, where the number of exterior oscillations is greater than the number of interior oscillations.

Embodiments herein may include a seal including: an annular jacket including a body defining an annular recess; and an energizing element disposed within the recess, the energizing element including: an energizing element body including an annular filament oriented about a central axis, the annular filament including a plurality of oscillations generally directed down the central axis, where the plurality of oscillations include an exterior oscillation from a center point, and an interior oscillation from the center point, where the exterior oscillation is connected to the interior oscillation across the center point by an arcuate portion spanning a circumferential distance wider than a circumferential width of the annular filament.

BRIEF DESCRIPTION OF THE DRAWINGS

Embodiments are illustrated by way of example and are not intended to be limited in the accompanying figures.

FIG. 2A1 includes a perspective view of an energizing element in accordance with an embodiment.

FIG. 2A2 includes a top view of an energizing element in accordance with an embodiment.

FIG. 2I includes a perspective view of an energizing element in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the energizing element arts.

Figure 1:
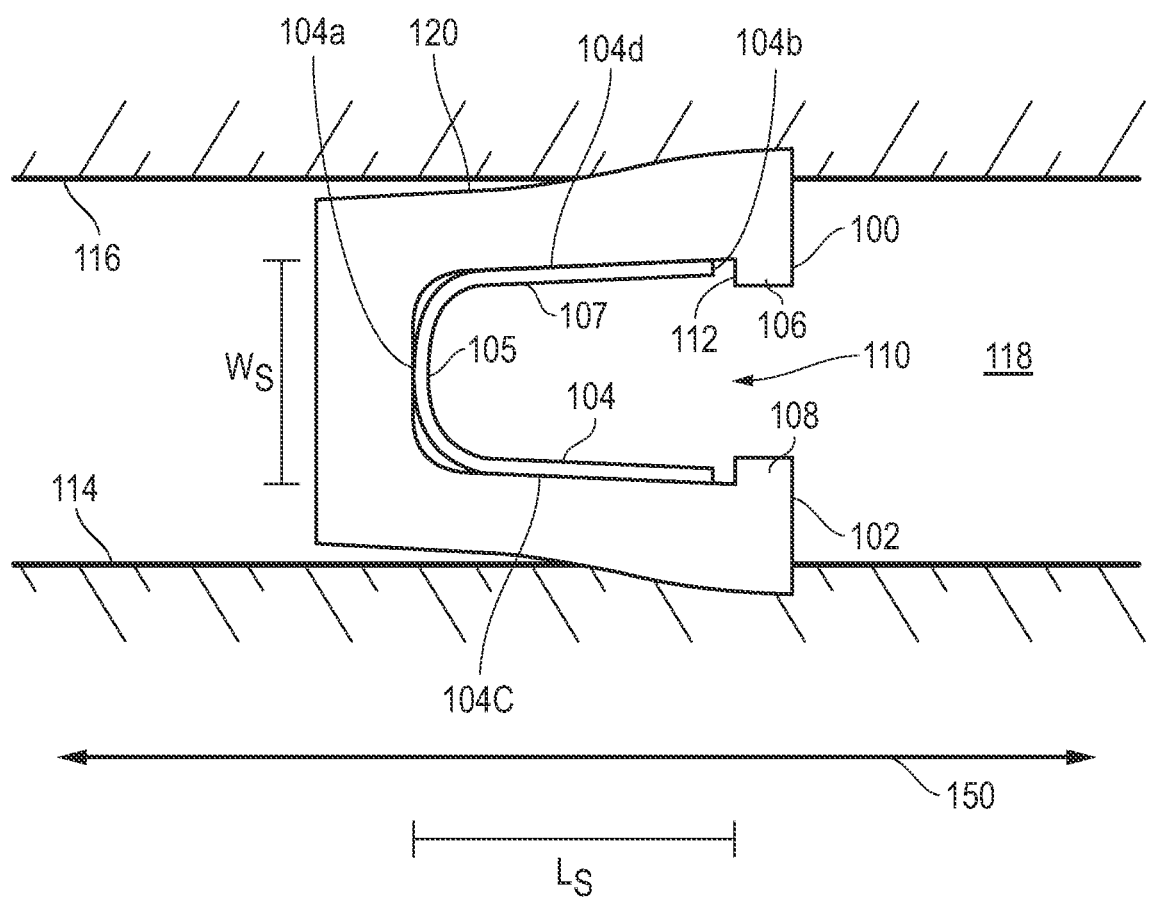
FIG. 1 includes a cross-sectional perspective view of a seal including an energizing element in accordance with an embodiment.

FIG. 1 illustrates a seal including an energizing element in accordance with an embodiment. Referring to FIG. 1, a seal 100 can generally include a jacket 102 and an energizing element 104. The jacket 102 may include fingers 106 and 108 defining a recess 110. The energizing element 104 may be disposed within the recess 110, such as partially disposed in the recess 110 or entirely disposed in the recess 110. In an embodiment, at least one of the fingers 106 and 108 may include a distal flange 112 extending toward the recess 110. The distal flange 112 may prevent dislodgment of the energizing element 104 from the recess 110. Any of these components may be formed in an annular orientation. Although FIG. 1 illustrates the seal 100 in an axial orientation, the seal 100 could be oriented in any potential orientation including radial or face sealing orientations as shown in FIG. 2A2 below.

In accordance with certain embodiments, as shown in FIG. 1, the seal 100 may be used between inner and outer components 114 and 116, such as a shaft and a bore, respectively. More particularly, the seal 100 may be disposed within an annulus formed by an area within a bore of the outer component 116 and an outer surface of the inner component 114. In certain embodiments, the inner component 114 may longitudinally translate, e.g., reciprocate, relative to the outer component 116. In other embodiments, the inner component 114 may rotate relative to the outer component 116. Alternatively, in certain embodiments, the outer component 116 may longitudinally translate, e.g., reciprocate, relative to the inner component 114. In other embodiments, the outer component 116 may rotate relative to the inner component 114. The seal 100 may prevent or reduce ingress or egress of one or more fluidic components from a first side of the seal to a second, opposite side thereof.

In a number of embodiments, the seal 100 (or any of its components) may have a radial tolerance of at least 0.1 mm, such as at least 0.2 mm, at least 0.3 mm, at least 0.4 mm, at least 0.5 mm, at least 1 mm, at least 2 mm, at least 3 mm, at least 4 mm, or even at least 5 mm. As used herein, "radial tolerance" refers to the seal's ability to absorb manufacturing and installation tolerances between shaft and bore (or inner and outer components). Traditional seals are unable to absorb tolerances as they require precise machining and manufacturing tolerances (specifically in the axial direction relative to the seal) and thus are not adapted to readily deform and accommodate unanticipated manufacturing and installation tolerances.

As described herein, the energizing element 104 may be used in seal applications, but is not necessarily limited to seals applications. The energizing element 104 may include a body 105 adapted to provide an outwardly biasing force in at least one outwardly oriented direction, such as toward at least one of the fingers 106 and 108. In a number of embodiments, the energizing element 104 may provide a radial biasing force against the jacket of between 0.1 N/mm and 1000 N/mm.

In an embodiment, the energizing element 104 may have an O-shaped cross-sectional profile in the axial direction. In an embodiment, the energizing element 104 may have a circular cross-sectional profile in the axial direction. In an embodiment, the energizing element 104 may have an oval cross-sectional profile in the axial direction. In an embodiment, the energizing element 104 may have a polygonal cross-sectional profile in the axial direction. In another embodiment, the energizing element 104 may have a cross-sectional profile selected from a D-shape, a U-shape, a V-shape, or a C-shape in the axial direction. In a particular embodiment, the energizing element 104 may have a cantilevered profile where surfaces of the energizing element 104 extend in a manner adjacent to at least one of the fingers 106 or 108. The cantilevered portions of the energizing element 104 may outwardly bias the fingers 106 and 108 apart from one another.

In a number of embodiments, the energizing element 104 may include a body 105 including a filament 107. The filament 107 may be an annular filament oriented about a central axis 150. The filament 107 may include a plurality of oscillations generally directed down the central axis 150 as described in further detail below. In some embodiments, the filament 107 may be a wire. In some embodiments, the filament 107 may have an arcuate cross section. In some embodiments, the filament 107 may be coiled or wrapped so as to form a generally O-shaped cross section in the axial direction. In yet another instance, the energizing element 104 may include a ribbon wrapped so as to form a generally O-shaped cross section in the axial direction. In a particular embodiment, the ribbon may have two major surfaces spaced apart from each other by a thickness. The ribbon may define a length, a width, and a thickness, where the length is greater than the width, and where the width is greater than the thickness. The ribbon may be wound such that adjacent coils partially overlap one another in a radial direction, such as by at least 10%, at least 20%, or at least 30%, or such that adjacent coils do not overlap in a radial direction. Prior to installation, the energizing element 104 may define a diameter that may be greater than a diameter of the recess 110. That is, in an embodiment, the energizing element 104 may be oversized for the recess 110.

In a number of embodiments, the filament 107 forming the coil of the energizing element 104 may be rectangular, square, circular, elliptical, or keystone in cross section. The filament 207 forming the coil of the energizing element 104 may be turned at a pitch of between 0.025 mm and 25.4 mm, such as between 0.05 mm and 10 mm. The filament 107 forming the coil of the energizing element 104 may have a filament diameter of between 0.01 mm and 25.4 mm, such as between 0.05 mm and 5 mm. The filament 107 forming the coil of the energizing element 104 may have an energizing element diameter of between 0.05 mm and 5000 mm, such as between 0.1 mm and 3000 mm. The energizing element 104 may have a spring load of between 0.01 N/mm to 20 N/mm, such as 0.5 N/mm to 15 N/mm, such as 1 N/mm to 10 N/mm, or such as 2.5 N/mm to 7.5 N/mm.

In an embodiment, the energizing element 104 may float relative to the jacket 102. More particularly, the energizing element 104 may move freely with respect to the recess 110. In another embodiment, the energizing element 104 may be coupled to the jacket 102, such as, for example, by an adhesive, mechanical deformation of one or both of the jacket 102 and energizing element 104, a threaded or non-threaded fastener, or by at least partially embedding the energizing element 104 within the jacket 102. In an embodiment, ends of the energizing element 104 may be encapsulated within the jacket 102 so as to prevent dislodgement of the energizing element 104 from the jacket 102. In embodiments utilizing adhesive, the adhesive layer (not illustrated) may be disposed between at least a portion of the energizing element 104 and the jacket 102. The adhesive layer may comprise a hot melt adhesive. Examples of adhesives that can be used include fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C=O, —C—O—R, —COH, —COOH, —COOR, —CF$_2$=CF—OR, or any combination thereof, where R is a cyclic or linear organic group containing between 1 and 20 carbon atoms. Additionally, the adhesive can include a copolymer.

In an embodiment, the energizing element 104 can be formed from any suitable material recognized by those of ordinary skill in the art. By way of a non-limiting example, the energizing element 104 may include a polymer, a ceramic, a metal, an alloy, or a combination thereof. In a particular instance, the energizing element 104 can have a wrapped design. For example, an internal portion of the energizing element 104 may include a first material different from a material of an external portion of the energizing element 104. The external portion may wrap around all, or a portion, of the internal portion. In a particular embodiment, the energizing element 104 includes a metal. In a particular embodiment, the metal can be coated or surface treated to prevent corrosion or another undesirable effect from environmental exposure. Exemplary metals include steel, spring steel, stainless steel, bronze, copper, Monel, Inconel, Elgiloy, Hastelloy, and oil tempered chrome silicon or vanadium. In an embodiment, the energizing element 104 may include molybdenum, cobalt, iron, chromium, copper, manganese, titanium, zirconium, aluminum, carbon, tungsten, or any combination thereof. In a particular embodiment, the energizing element 104 includes stainless steel, such as 301 Stainless Steel, 302/304 Stainless Steel, 316 Stainless Steel, or 17-7 Stainless Steel. In a particular embodiment, the energizing element 104 can at least partially include, or even consist essentially of, a metal, such as a steel, or even more particularly energizing element steel. In another particular embodiment, the energizing element 104 can at least partially include, or even consist essentially of, for example, Elgiloy, Inconel, Hastelloy, or a combination thereof. In yet a further particular embodiment, the energizing element 104 can include cobalt, chromium, nickel, iron, molybdenum, manganese, or a combination thereof. In a particular embodiment, the energizing element 104 can include at least 10 wt % of cobalt, such as at least 20 wt % of cobalt, at least 25 wt % of cobalt, at least 30 wt % of cobalt, at least 35 wt % of cobalt, or even at least 40 wt % of cobalt.

In an embodiment, the energizing element 104 may include a polymer which may be selected from the group including a polyketone, a polyaramid, a polyphenylene sulfide, a polyethersulfone, a polypheylene sulfone, a polyamideimide, ultra high molecular weight polyethylene, a fluoropolymer, a polybenzimidazole, a polyacetal, polybutylene terephthalate (PBT), polypropylene (PP), polycarbonate (PC), Acrylonitrile butadiene styrene (ABS), polyethylene terephthalate (PET), a polyimide (PI), polyetherimide, polyetheretherketone (PEEK), polyethylene (PE), a polysulfone, a polyamide (PA), polyphenylene oxide, polyphenylene sulfide (PPS), a polyurethane, a polyester, a liquid crystal polymer (LCP), or any combination thereof. In a particular embodiment, the energizing element 104 can at least partially include, or even consist essentially of, a fluoropolymer. Exemplary fluoropolymers include a polytetrafluoroethylene (PTFE), a polyether ether ketone (PEEK), a polyimide (PI), a polyamide-imide (PAI), a fluorinated ethylene propylene (FEP), a polyvinylidene fluoride (PVDF), a perfluoroalkoxy (PFA), a terpolymer of tetrafluoroethylene, a hexafluoropropylene and vinylidene fluoride (THV), a polychlorotrifluoroethylene (PCTFE), an ethylene tetrafluoroethylene copolymer (ETFE), an ethylene chlorotrifluoroethylene copolymer (ECTFE), or any combination thereof. Other fluoropolymers, polymers, and blends may be included in the composition of the jacket 100. In another particular embodiment, the jacket 100 can at least partially include, or even consist essentially of, a polyethylene (PE) such as an ultra-high-molecular-weight polyethylene (UHMWPE).

In an embodiment, the energizing element 104 may include a ceramic which may be selected from the group including a glass filler, silica, clay mica, kaolin, lithium soap, graphite, boron nitride, molybdenum disulfide, tungsten disulfide, polytetrafluoroethylene, carbon nitride, tungsten carbide, or diamond like carbon.

In an embodiment, the energizing element 104 may have a diameter less than 150% the depth of the annular recess 106, such as less than 100% of the depth of the annular recess 106, or even less than 75% of the depth of the annular recess 106. In an embodiment, the diameter of the energizing element 104 can be no less than 10% of the depth of the annular recess 106.

As contemplated in at least one embodiment described herein, the energizing element 104 can include a length of material formed into a helical energizing element having a plurality of coils. In an embodiment, the energizing element 104 can include at least 2 coils, such as at least 3 coils, at least 4 coils, at least 5 coils, at least 10 coils, at least 100 coils, at least 200 coils, at least 300 coils, at least 400 coils, at least 500 coils, or even at least 1000 coils. The length of material forming the energizing element 104 can have a polygonal or ellipsoidal cross section. For example, in an embodiment, the energizing element 104 can be formed from circular wire. In another embodiment, the energizing element 104 can be formed from a ribbon of material wound into a plurality of coils. The coils of the energizing element 104 can be adjacent or even partially overlap one another. In a particular instance the coils can be parallel to one another. In another instance, the coils can cant relative to each other. That is, the coils can be angularly offset and angled with respect to one another.

In an embodiment, the energizing element 104 may have a length $L_S$ from a first axial end 104a to a second axial end 104b of the energizing element 104. The energizing element 104 may have a length $L_S$ of at least 0.1 mm, at least 1 mm, at least 5 mm, at least 10 mm, at least 25 mm, at least 50 mm, at least 75 mm, at least 100 mm, at least 150 mm, at least 250 mm, at least 500 mm. The energizing element 104 may have a length $L_S$ that may be no greater than 1500 mm or no greater than 1000 mm. In a number of embodiments, the energizing element 104 may have a length $L_S$ of between 0.3 mm and 6 mm. It will be further appreciated that the energizing element 104 may have a length $L_S$ that may be any value between any of the minimum and maximum values noted above. It can also be appreciated that the energizing element 104 may have a length $L_S$ that may vary along its circumference.

In an embodiment, the energizing element 104 may have a thickness $W_S$ from a first radial end 104c to a second radial end 104d of the energizing element 104. The energizing element 104 may have a thickness $W_S$ of at least 0.1 mm, at least 1 mm, at least 5 mm, at least 10 mm, at least 25 mm, at least 50 mm, at least 75 mm, at least 100 mm, at least 150 mm, at least 250 mm, at least 500 mm. The energizing element 104 may have a thickness $W_S$ that may be no greater than 1500 mm or no greater than 1000 mm. In a number of embodiments, the energizing element 104 may have a thickness $W_S$ of between 0.3 mm and 6 mm. It will be further appreciated that energizing element 104 may have a thickness $W_S$ that may be any value between any of the minimum and maximum values noted above. It can also be appreciated that energizing element 104 may have a thickness $W_S$ that may vary along its circumference.

FIGS. 2A1-2I illustrate perspective views of energizing elements according to a number of embodiments. In a number of embodiments, as stated above, the energizing element 204 may include an energizing element body 205 including a filament 207. The filament 207 may be annular and oriented about a central axis 205. Further the filament 207 may include at least one and/or a plurality of oscillations 209 generally directed down the central axis 250. An oscillation 209 may be defined as the path a filament 207 travels from one transversal of a circumferentially oriented line 275 perpendicular to the central axis 205 at the first axial end 204a to the neighboring transversal of the circumferentially oriented line 275 perpendicular to the central axis 250 at the first axial end 204a of the energizing element 204. The circumferentially oriented line 275 is shown best in FIG. 2D. In a number of embodiments, while the energizing element 204 may be oriented annularly about the central axis 250, the oscillations 209 may be generally directed down the central axis 250 (e.g. have peaks and valleys extending axially down the central axis 250). Alternatively, as shown best in FIG. 2F, the energizing element 204 may be oriented linearly on a line 275 perpendicular to a central axis 250 at the first axial end 204a of the energizing element 204.

Figure 2B:
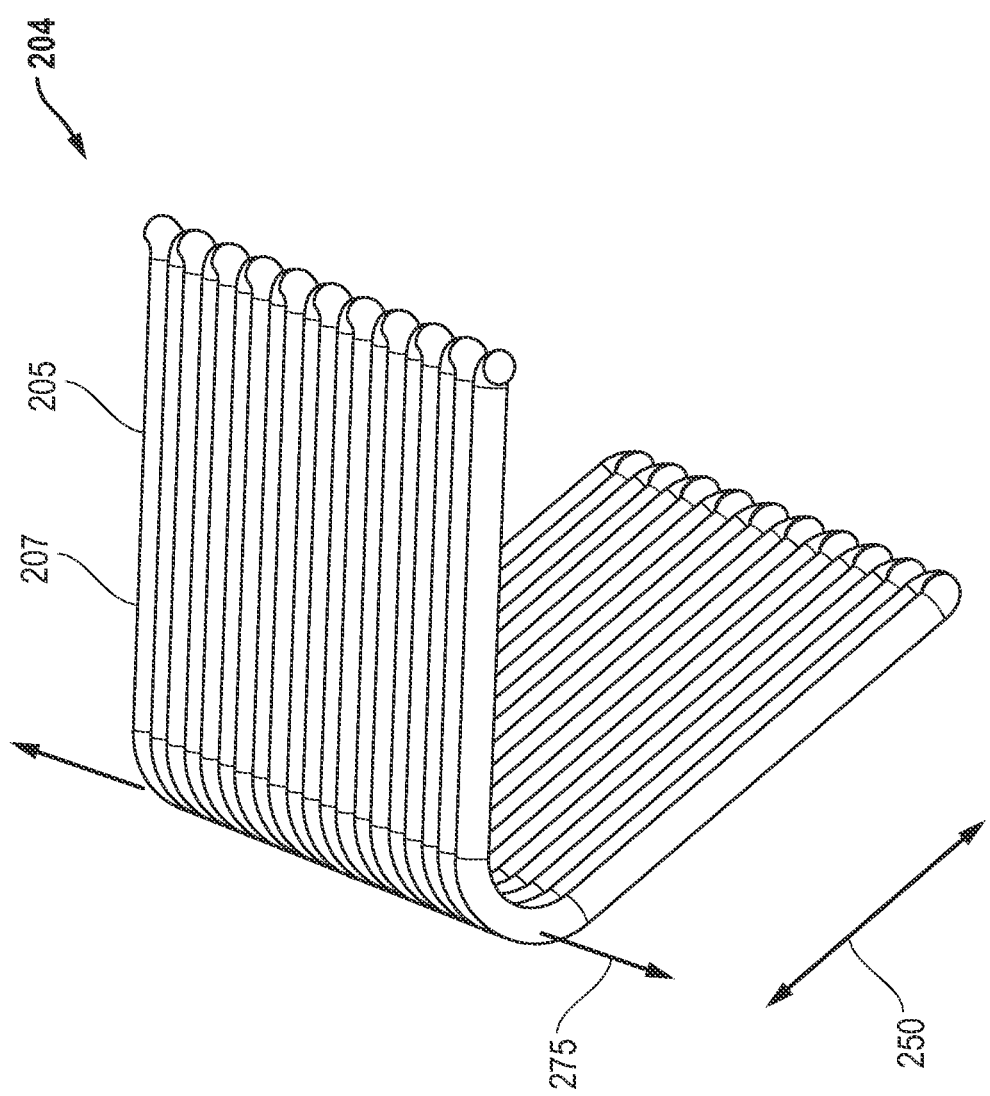
FIG. 2B includes a perspective view of an energizing element in accordance with an embodiment.

FIGS. 2A1-2B illustrate perspective views of energizing elements according to a number of embodiments. As shown in FIG. 2A1, the energizing element 204 may have a C-shape in the circumferential direction. Alternatively, as shown in FIG. 2A2, the energizing element 204 may have a C-shape in the radial direction and form a face seal. Any of the embodiments described herein may also be contemplated as face seals. As shown in FIG. 2B, the energizing element 204 may have a V-shape in the circumferential direction. In a number of embodiments, as shown in FIG. 2A1, the circumferential width, $W_{EE}$, of the annular filament 207 may be larger than circumferential width of the internal circumferential void, $W_V$, such as $W_{EE} \geq 1.2 W_V$, such as $W_{EE} \geq 1.5 W_V$, such as $W_{EE} \geq 2 W_V$, such as $W_{EE} \geq 5 W_V$, or such as $W_{EE} \geq 10 W_V$.

Figure 2C:
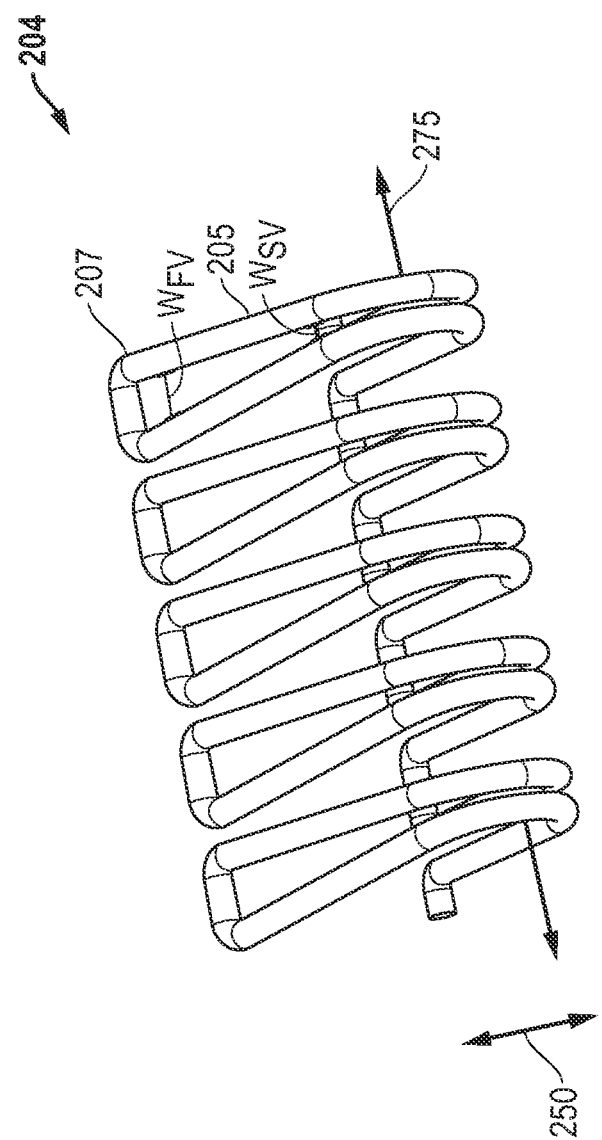
FIG. 2C includes a perspective view of an energizing element in accordance with an embodiment.

FIG. 2C illustrates a perspective view of an energizing element according to a number of embodiments. As shown in FIG. 2C, at least one oscillation 209 of the energizing element 204 may include an internal circumferential void having a first circumferential width, $W_{FV}$, and a second circumferential width, $W_{SV}$, located at a different axial position along the oscillation 209, and $W_{FV} \neq W_{SV}$. In a number of embodiments, $W_{FV} \geq 1.2 W_{SV}$, such as $W_{FV} \geq 1.5 W_{SV}$, such as $W_{FV} \geq 2 W_{SV}$, such as $W_{FV} \geq 5 W_{SV}$, or such as $W_{FV} \geq 10 W_{SV}$. In a number of embodiments, the circumferential width of the internal circumferential void may change over the course of the oscillation path.

Figure 2D:
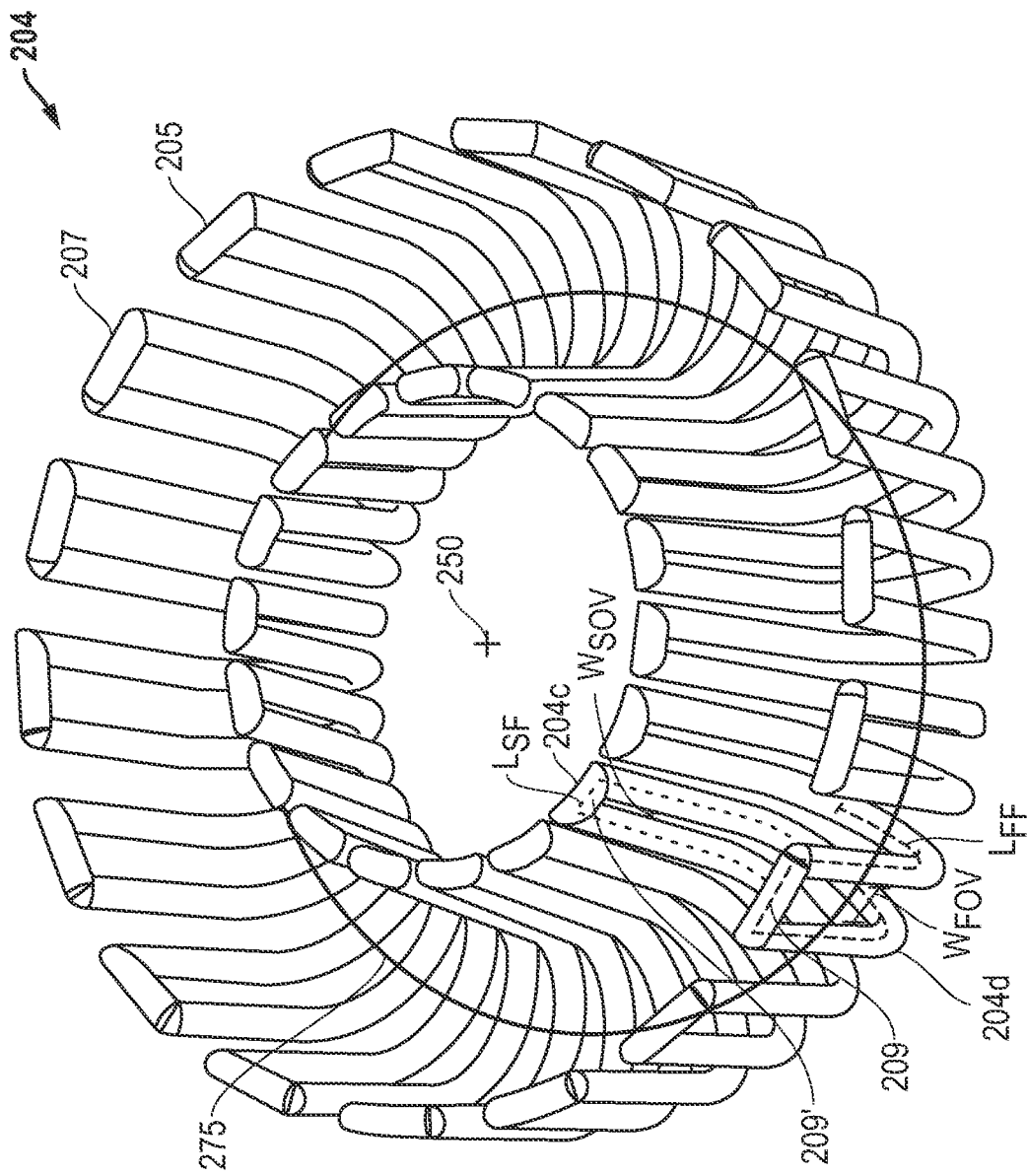
FIG. 2D includes a perspective view of an energizing element in accordance with an embodiment.

FIG. 2D illustrates a perspective view of an energizing element according to a number of embodiments. As shown in FIG. 2D, the plurality of oscillations may include a first oscillation 209 generally directed down the central axis 250 at a second radial end 204d and a circumferentially neighboring second oscillation 209' generally directed down the central axis 250 at a first radial end 204c. The first oscillation 209 may be formed from the two points where the filament 207 meets the center point (e.g. where it intersects the circumferentially oriented line 275 perpendicular to the central axis 250). The second oscillation 209' may be formed from the two points where the filament 207 meets the center point (e.g. where it intersects the circumferentially oriented line 275 perpendicular to the central axis 250). The first oscillation 209 may include an internal circumferential void having a circumferential width, $W_{FOV}$, and the second oscillation 209' may include an internal circumferential void having a circumferential width, $W_{SOV}$, and $W_{FOV} \neq W_{SOV}$, such as $W_{FOV} \geq 2W_{SOV}$, such as $W_{FOV} \geq 5W_{SOV}$, or such as $W_{FOV} \geq 10\ W_{SOV}$. In a number of embodiments, the circumferential width of the internal circumferential void may change over the course of the oscillation path.

Further, as shown in FIG. 2D, the plurality of oscillations may include a first oscillation 209 generally directed down the central axis 250 at a first radial end 204c and a circumferentially neighboring second oscillation 209' generally directed down the central axis at a second radial end 204d. The first oscillation 209 may be formed from the two points where the filament 207 meets the center point (e.g. where it intersects the circumferentially oriented line 275 perpendicular to the central axis 250). The second oscillation 209' may be formed from the two points where the filament 207 meets the center point (e.g. where it intersects the circumferentially oriented line 275 perpendicular to the central axis 250). In a number of embodiments, the first oscillation 209 from a center point 275 may have a filament length, (indicated by segmented line) Ln. In a number of embodiments, the second oscillation 209' from a center point 275 may have a filament length, (indicated by dotted line) $L_{SF}$, and $L_{FF} \neq L_{SF}$, $L_{FF} \geq 1.1\ L_{SF}$, such as $L_{FF} \geq 1.2L_{SF}$, such as $L_{FF} \geq 1.5L_{SF}$, such as $L_{FF} \geq 2L_{SF}$, such as $L_{FF} \geq 5L_{SF}$, or such as $L_{FF} \geq 10L_{SF}$. In a number of alternative embodiments, $L_{SF} \geq 1.1L_{FF}$, such as $L_{SF} \geq 1.2L_{FF}$, such as $L_{SF} \geq 1.5L_{FF}$, such as $L_{SF} \geq 2L_{FF}$, such as $L_{SF} \geq 5L_{FF}$, or such as $L_{SF} \geq 10L_{FF}$.

Figure 2E:
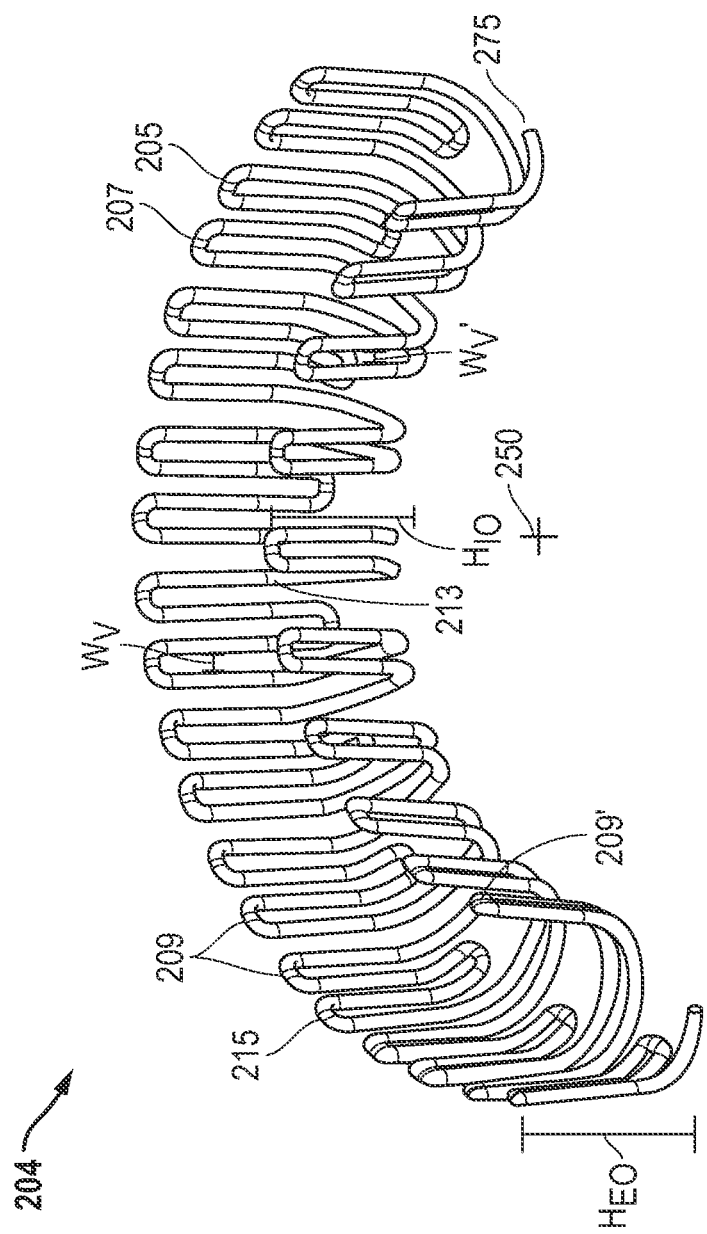
FIG. 2E includes a perspective view of an energizing element in accordance with an embodiment.

FIG. 2E illustrates a perspective view of an energizing element according to a number of embodiments. As shown in FIG. 2E, the plurality of oscillations may include a plurality of exterior oscillations 209 from a center point 275 (e.g. including a point along the first radial end 204c), and a plurality of interior oscillations 209' from the center point 275 (e.g. including a point along the second radial end 204d), where the number of exterior oscillations 209 may be greater than the number of interior oscillations 209'. In a number of embodiments, the number of exterior oscillations 209 may be greater than two times the number of interior oscillations 209', such as three times the number of interior oscillations 209', such as four times the number of interior oscillations 209', or such as five times the number of interior oscillations 209'.

Further, as shown in FIG. 2E, in a number of embodiments, the plurality of oscillations may include a plurality of exterior oscillations 209 from a center point 275 (e.g. including a point along the first radial end 204c), and a plurality of interior oscillations 209' from the center point 275 (e.g. including a point along the second radial end 204d), where the plurality of oscillations may have an interior oscillation 209' having an axial apex 213 having a height, $H_{IO}$, and an exterior oscillation 209 having an axial apex 215 having a height, $H_{EO}$, where $H_{IO} \geq H_{EO}$, such as $H_{IO} \geq 2H_{EO}$, such as $H_{IO} \geq 5H_{EO}$, or such as $H_{IO} \geq 10H_{EO}$. In a number of alternative embodiments, $H_{EO} \geq H_{IO}$, such as $H_{EO} \geq 2H_{IO}$, such as $H_{EO} \geq 5H_{IO}$, or such as $H_{EO} \geq 10H_{IO}$. In a number of embodiments, at least one of an axial apex 213, 215 of the interior oscillation 209' or the exterior oscillation 209 may be generally disposed at a mid-way point of the circumferential width, $W_V'$, $W_V$, of an internal circumferential void or external circumferential void. In a number of embodiments, at least one of the axial apex 213, 215 of the interior oscillation 209' or the exterior oscillation 209 may include a circumferential ridge. In a number of embodiments, at least one of the axial apex 213, 215 of the interior oscillation 209' or the exterior oscillation 209 may be rectilinear. In a number of embodiments, as shown in FIG. 2E, at least one of the axial apex 213, 215 of the interior oscillation 209' or the exterior oscillation 209 may be rounded.

Figure 2F:
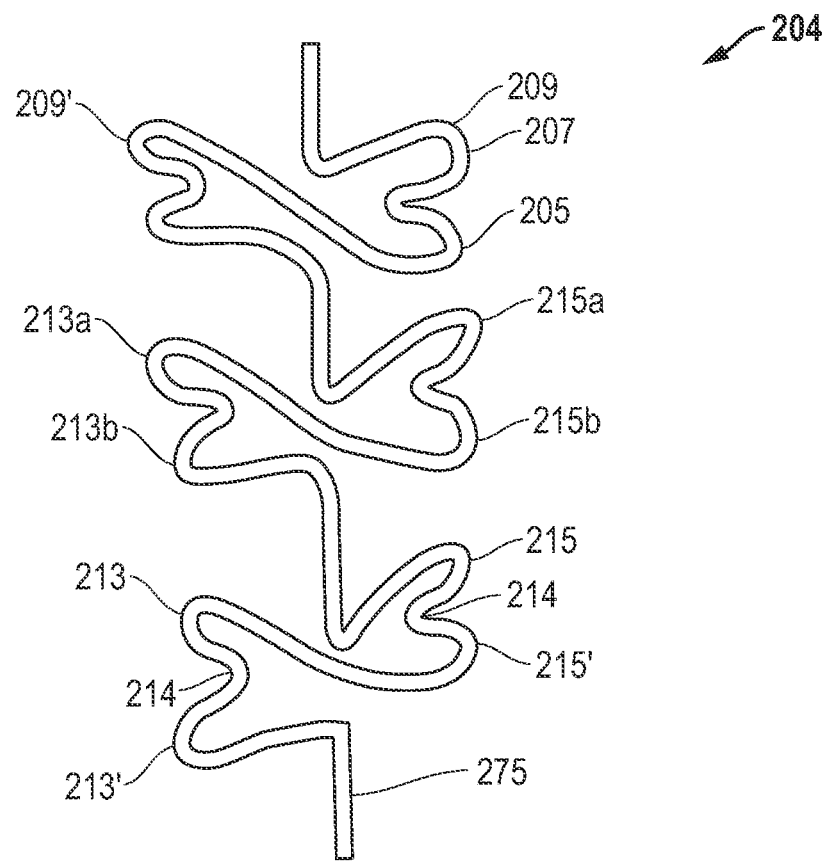
FIG. 2F includes a perspective view of an energizing element in accordance with an embodiment.

FIG. 2F illustrates a perspective view of an energizing element according to a number of embodiments. As shown in FIG. 2F, in a number of embodiments, at least one of the axial 213, 215 of the interior oscillation 209' or the exterior oscillation 209 may include a plurality of local axial apexes 213, 215, 213', 215'. In a number of embodiments, where the plurality of local axial apexes 213, 215, 213', 215' may be circumferentially spaced by a saddle 214. In a number of embodiments, at least one of the axial apex 213, 215 of the interior oscillation 209' or the exterior oscillation 209 may include an axial apex circumferentially spaced apart by a first axial shoulder 213a, 215a, and a second axial shoulder 213b, 215b.

Figure 2G:
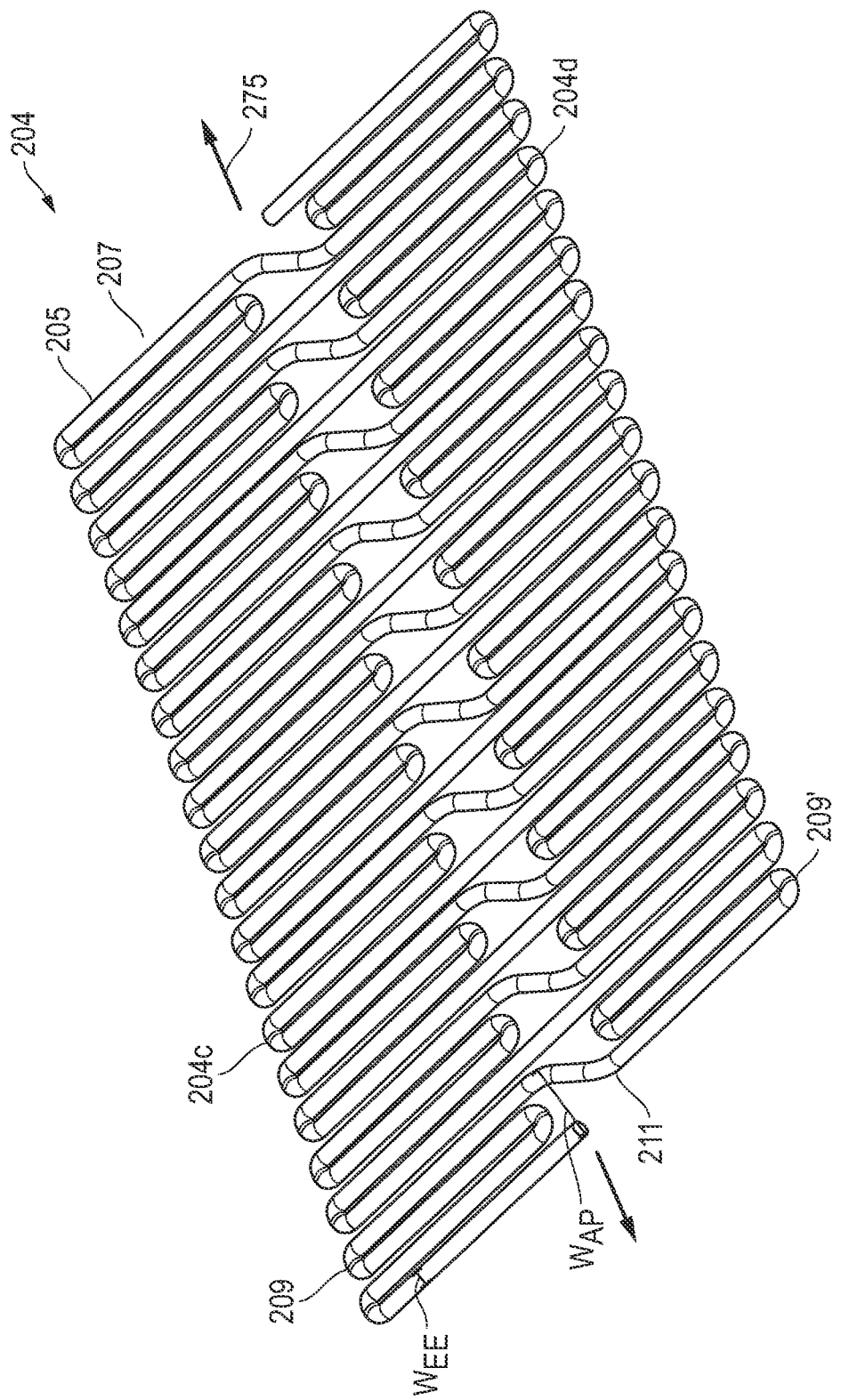
FIG. 2G includes a perspective view of an energizing element in accordance with an embodiment.

FIG. 2G illustrates a perspective view of an energizing element according to a number of embodiments. As shown in FIG. 2G, the plurality of oscillations may include a plurality of exterior oscillations 209 from a center point 275 (e.g. including a point along the first radial end 204c), and a plurality of interior oscillations 209' from the center point 275 (e.g. including a point along the second radial end 204d), where the exterior oscillation 209 may connected to the interior oscillation 209' across the center point 275 by an arcuate portion 211 spanning a circumferential distance, $W_{AP}$, wider than a circumferential width, $W_{EE}$, of the annular filament 207. In a number of embodiments, the circumferential distance, $W_{AP}$, of the arcuate portion 211 may be wider than two times the circumferential width, $W_{EE}$, of the annular filament 207, such as three times the circumferential width, $W_{EE}$, of the annular filament 207, such as four times the circumferential width, $W_{EE}$, of the annular filament 207, or such as five times the circumferential width, $W_{EE}$, of the annular filament 207.

Figure 2H:
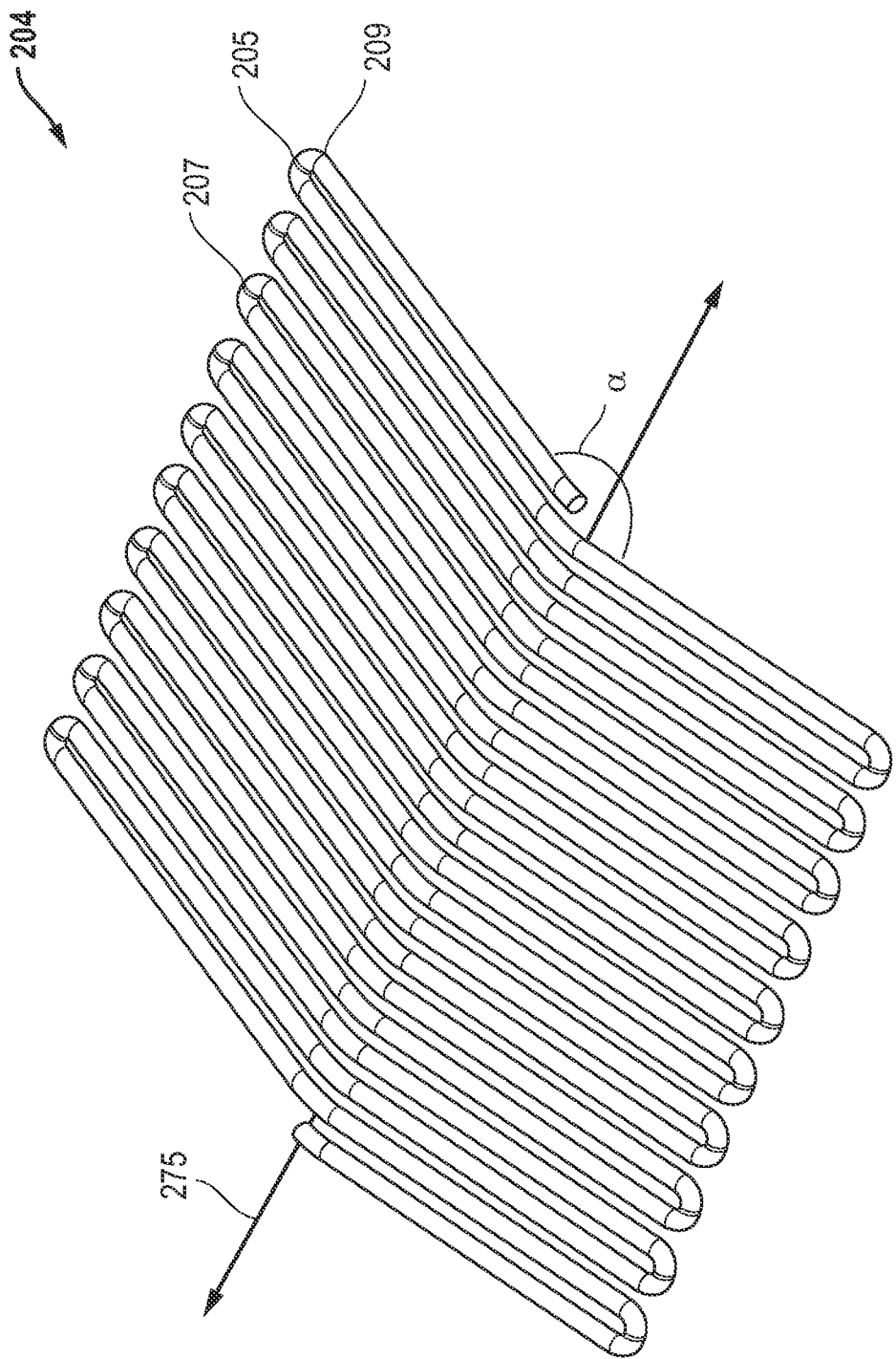
FIG. 2H includes a perspective view of an energizing element in accordance with an embodiment.
Figure 21:
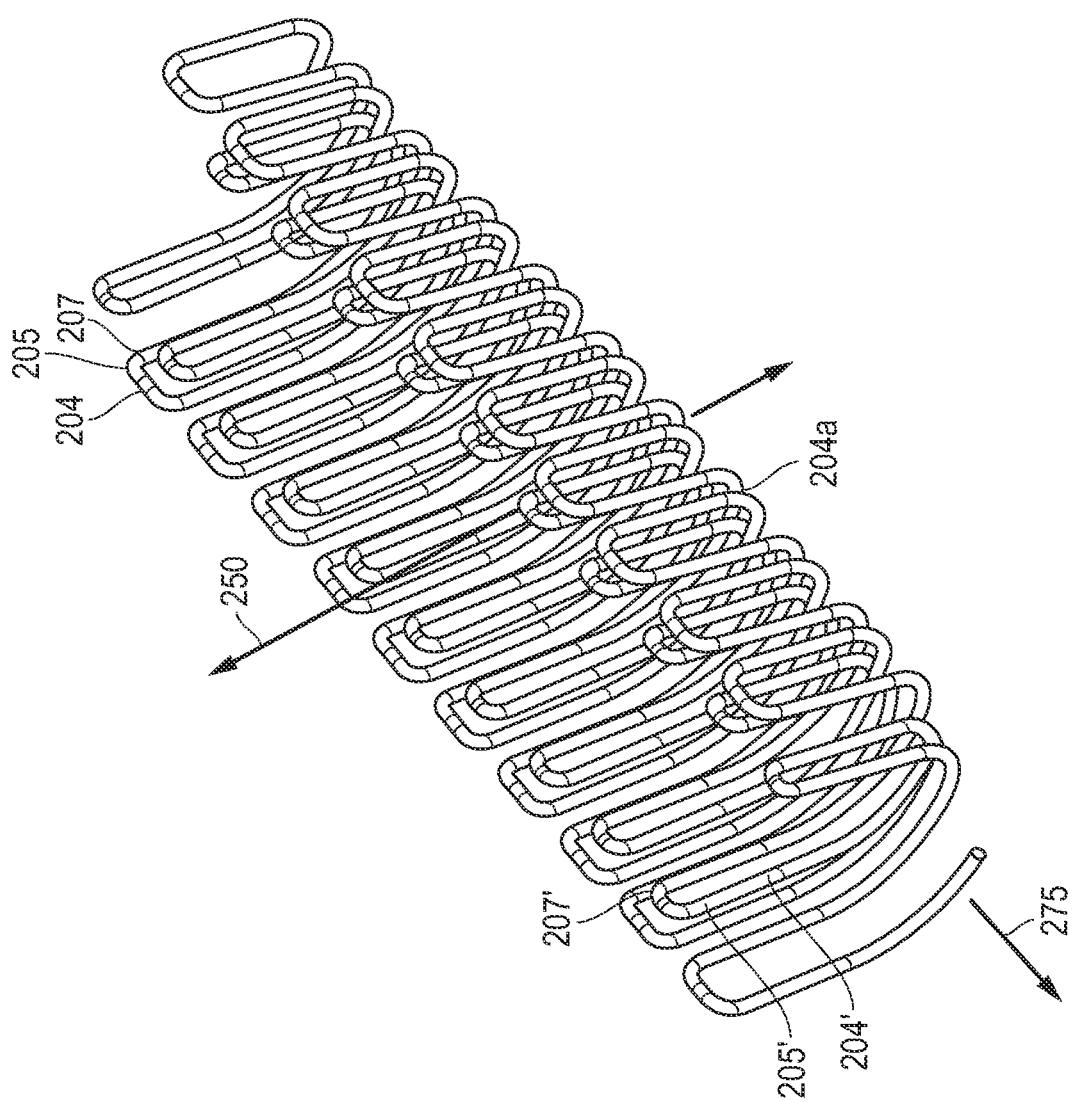

FIG. 2H illustrates a perspective view of an energizing element according to a number of embodiments. As shown in FIG. 2H, in a number of embodiments, the filament 208 may define an angle $\alpha$ in a radial direction between neighboring oscillations, (e.g. exterior oscillations 209 and interior oscillations 209'), where $\alpha$ may be between 0-180°, such as between 15-165°, such as between 30-150°, such as between 45-150°, such as between 60-135°, or such as between 75-120°.

FIG. 2I illustrates a perspective view of an energizing element according to a number of embodiments. As shown in FIG. 2I, in an embodiment, the energizing element 204 may include a plurality of energizing elements 204, 204'. In an embodiment, the energizing element 204 may include a first energizing element 204 and a second energizing element 204'. The second energizing element 204' may be disposed radially within the first energizing element 204. In an embodiment, as shown in FIG. 2I, the first energizing element 204 may be oriented as the embodiment of FIG. 2D with the second energizing element 204' may be oriented with an alternative pattern of annular void circumferential widths and disposed radially interior to the first energizing element 204. In other words, a number of embodiments, as shown in FIG. 2I, the plurality of energizing elements 204, 204' may be stacked upon each other in the axial direction.

Moreover, the first energizing element 204 may contact the second energizing element 204' at least partially along the inner surface of the second energizing element 204'. That is, the first and second energizing elements 204, 204' may be concentric and in contact with one another, effectively forming an energizing element having two-ply wall thickness. In an embodiment, the first energizing element 204 may provide an outwardly biasing force against the second energizing element 204' or vice versa. In an embodiment, the first and second energizing elements 204, 204' are both annular energizing elements. The cross section of the coils of the first energizing element 204 may differ from the cross section of the coils of the second energizing element 204' in shape, size, material, or physical characteristics. That is, the energizing elements 204, 204' may be different from one another. A lubricant or sliding material may be disposed at least partially between a surface of the first energizing element 204 and a surface of the second energizing element 204' and can reduce frictional resistance therebetween. The first or second energizing elements 204, 204' can include any of the features described above with respect to the energizing element 104. For example, the first or second energizing elements 204, 204' can at least partially include, or even consist essentially of, for example, Elgiloy, Inconel, Hastelloy, a steel, or a combination thereof.

Energizing elements described according to embodiments herein may allow for improved design customization and flexibility for a majority of applications including, but not limited to, seals applications. Further, energizing elements described according to embodiments herein may allow for improved load range performance for a majority of applications including, but not limited to, seals applications. Further, energizing elements described according to embodiments herein may allow for reduction of gaps in the energizing element for a majority of applications including, but not limited to, seals applications. Seals including energizing elements described according to embodiments herein may allow for the components of the seal to have a longer lifetime due to appropriately placed forces that lessen repeat compression and stressing of the individual components (e.g. the energizing element(s), jacket) due to vibration or actuation of the seal or other components within the assembly. Further, the seal described according to embodiments herein may prevent seal deformation under low and high cyclic pressure cycles. As a result, the lifetime of the components and the seal itself may be improved and overall leakage may be lessened.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Embodiment 1: An energizing element comprising: an energizing element body comprising an annular filament oriented about a central axis, the annular filament comprising a plurality of oscillations generally directed down the central axis, wherein at least one oscillation comprises an internal circumferential void having a first circumferential width, $W_{FV}$, and a second circumferential width, $W_{SV}$, located at a different axial position along the oscillation, and wherein $W_{FV} \geq 1.2 W_{SV}$.

Embodiment 2: An energizing element comprising: an energizing element body comprising an annular filament oriented about a central axis, the annular filament comprising a plurality of oscillations generally directed down the central axis, wherein the plurality of oscillations comprise a first oscillation from a center point having a filament length, $L_{FF}$, and a circumferentially neighboring second oscillation from the center point having a filament length, $L_{SF}$, and wherein $L_{FF} \neq L_{SF}$.

Embodiment 3: An energizing element comprising: an energizing element body comprising an annular filament oriented about a central axis, the annular filament comprising a plurality of oscillations generally directed down the central axis, wherein the plurality of oscillations comprise a plurality of exterior oscillations from a center point, and a plurality of interior oscillations from the center point, wherein the number of exterior oscillations is greater than the number of interior oscillations.

Embodiment 4: An energizing element comprising: an energizing element body comprising an annular filament oriented about a central axis, the annular filament comprising a plurality of oscillations generally directed down the central axis, wherein the plurality of oscillations comprise an exterior oscillation from a center point, and an interior oscillation from the center point, wherein the exterior oscillation is connected to the interior oscillation across the center point by an arcuate portion spanning a circumferential distance wider than a circumferential width of the annular filament.

Embodiment 5: A seal comprising: an annular jacket comprising a body defining an annular recess; and an energizing element disposed within the annular recess, the energizing element comprising: an energizing element body comprising an annular filament oriented about a central axis, the annular filament comprising a plurality of oscillations generally directed down the central axis, wherein at least one oscillation comprises an internal circumferential void having a first circumferential width, $W_{FV}$, and a second circumferential width, $W_{SV}$, located at a different axial position along the oscillation, and wherein $W_{FV} \geq 1.2 W_{SV}$.

Embodiment 6: A seal comprising: an annular jacket comprising a body defining an annular recess; and an energizing element disposed within the annular recess, the energizing element comprising: an energizing element body comprising an annular filament oriented about a central axis, the annular filament comprising a plurality of oscillations generally directed down the central axis, wherein the plurality of oscillations comprise a first oscillation from a center point having a filament length, $L_{FF}$, and a circumferentially neighboring second oscillation from the center point having a filament length, $L_{SF}$, wherein $L_{FF} \neq L_{SF}$.

Embodiment 7: A seal comprising: an annular jacket comprising a body defining an annular recess; and an energizing element disposed within the annular recess, the energizing element comprising: an energizing element body comprising an annular filament oriented about a central axis, the annular filament comprising a plurality of oscillations generally directed down the central axis, wherein the plurality of oscillations comprise a plurality of exterior oscillations from a center point, and a plurality of interior oscillations from the center point, wherein the number of exterior oscillations is greater than the number of interior oscillations.

Embodiment 8: A seal comprising: an annular jacket comprising a body defining an annular recess; and an energizing element disposed within the annular recess, the energizing element comprising: an energizing element body comprising an annular filament oriented about a central axis, the annular filament comprising a plurality of oscillations generally directed down the central axis, wherein the plurality of oscillations comprise an exterior oscillation from a center point, and an interior oscillation from the center point, wherein the exterior oscillation is connected to the interior oscillation across the center point by an arcuate portion spanning a circumferential distance wider than a circumferential width of the annular filament.

Embodiment 9: The energizing element of embodiment 1, wherein $W_{FV} \geq 1.1 W_{SV}$, such as $W_{FV} \geq 1.2 W_{SV}$, such as $W_{FV} \geq 1.5 W_{SV}$, such as $W_{FV} \geq 2 W_{SV}$, such as $W_{FV} \geq 5 W_{SV}$, or such as $W_{FV} \geq 10 W_{SV}$.

Embodiment 10: The energizing element of embodiment 2, wherein $L_{FF} \geq 1.1 L_{SF}$, such as $L_{FF} \geq 1.2 L_{SF}$, such as $L_{FF} \geq 1.5 L_{SF}$, such as $L_{FF} \geq 2 L_{SF}$, such as $L_{FF} \geq 5 L_{SF}$, or such as $L_{FF} \geq 10 L_{SF}$.

Embodiment 11: The energizing element of embodiment 2, wherein $L_{SF} \geq 1.1 L_{FF}$, such as $L_{SF} \geq 1.2 L_{FF}$, such as $L_{SF} \geq 1.5 L_{FF}$, such as $L_{SF} \geq 2 L_{FF}$, such as $L_{SF} \geq 5 L_{FF}$, or such as $L_{SF} \geq 10 L_{FF}$.

Embodiment 12: The energizing element of embodiment 3, wherein the number of exterior oscillations is greater than two times the number of interior oscillations, such as three times the number of interior oscillations, such as four times the number of interior oscillations, or such as five times the number of interior oscillations.

Embodiment 13: The energizing element of embodiment 4, wherein the circumferential distance of the arcuate portion is wider than two times the circumferential width of the annular filament, such as three times the circumferential width of the annular filament, such as four times the circumferential width of the annular filament, or such as five times the circumferential width of the annular filament.

Embodiment 14: The energizing element or seal of any of embodiments 1-8, wherein the filament defines an angle α in a radial direction between neighboring oscillations, wherein α is between 0-180°.

Embodiment 15: The energizing element or seal of any of embodiments 1-8, wherein the plurality of oscillations has an interior oscillation having an axial apex having a height, $H_{IO}$, and an exterior oscillation having an axial apex having a height, $H_{EO}$, wherein $H_{IO} \geq H_{EO}$, such as $H_{IO} \geq 2 H_{EO}$, such as $H_{IO} \geq 5 H_{EO}$, or such as $H_{IO} \geq 10 H_{EO}$.

Embodiment 16: The energizing element or seal of any of embodiments 1-8, wherein the plurality of oscillations has an interior oscillation having an axial apex having a height, HD, and an exterior oscillation having an axial apex having a height, $H_{EO}$, wherein $H_{EO} \geq H_{IO}$, such as $H_{EO} \geq 2 H_{IO}$, such as $H_{EO} \geq 5 H_{IO}$, or such as $H_{EO} \geq 10 H_{IO}$.

Embodiment 17: The energizing element or seal of any of embodiments 15 or 16, wherein at least one of an axial apex of the interior oscillation or the exterior oscillation is generally disposed at a mid-way point of the circumferential width, $W_V$, of an internal circumferential void or external circumferential void.

Embodiment 18: The energizing element or seal of any of embodiments 15 or 16, wherein at least one of an axial apex of the interior oscillation or the exterior oscillation comprises a circumferential ridge.

Embodiment 19: The energizing element or seal of any of embodiments 15 or 16, wherein at least one of an axial apex of the interior oscillation or the exterior oscillation is rectilinear.

Embodiment 20: The energizing element or seal of any of embodiments 15 or 16, wherein at least one of an axial apex of the interior oscillation or the exterior oscillation is rounded.

Embodiment 21: The energizing element or seal of any of embodiments 15 or 16, wherein at least one of an axial apex of the interior oscillation or the exterior oscillation comprises a plurality of local axial apexes.

Embodiment 22: The energizing element or seal of embodiment 21, wherein the plurality of local axial apexes are circumferentially spaced apart by a saddle.

Embodiment 23: The energizing element or seal of any of embodiments 15 or 16, wherein at least one of an axial apex of the interior oscillation or the exterior oscillation comprises an axial apex circumferentially spaced apart by a first axial shoulder and a second axial shoulder.

Embodiment 24: The energizing element or seal of any of embodiments 1-8, wherein the energizing element has a cross-sectional profile selected from a D-shape, a U-shape, a V-shape, an O-shape, an E-shape, or a C-shape.

Embodiment 25: The energizing element or seal of any of embodiments 1-8, wherein the energizing element has a U-shape cross-sectional profile.

Embodiment 26: The energizing element or seal of any of embodiments 1-8, wherein the energizing element has a V-shape cross-sectional profile.

Embodiment 27: The energizing element or seal of any of embodiments 1-8, wherein the energizing element is turned at a pitch of between 0.025 mm and 25.4 mm.

Embodiment 28: The energizing element or seal of any of embodiments 1-8, wherein the energizing element has a filament diameter of between 0.025 mm and 25.4 mm.

Embodiment 29: The energizing element or seal of any of embodiments 1-8, wherein the energizing element has an energizing element diameter of between 0.05 mm and 1500 mm.

Embodiment 30: The energizing element or seal of any of embodiments 1-8, wherein the energizing element has a spring rate of between CC and DD.

Embodiment 31: The energizing element or seal of any of embodiments 1-8, wherein the energizing element has a flat, rectangular, square, or keystone cross-sectional filament.

Embodiment 32: The energizing element or seal of any of embodiments 1-8, wherein the energizing element has a circular cross-sectional filament.

Embodiment 33: The energizing element or seal of any of embodiments 1-8, wherein the energizing element comprises a polymer.

Embodiment 34: The energizing element or seal of any of embodiments 1-8, wherein the energizing element comprises a metal.

Embodiment 35: The energizing element or seal of any of embodiments 1-8, wherein the energizing element comprises a ceramic.

Embodiment 36: The energizing element or seal of any of embodiments 1-8, wherein the energizing element comprises a plurality of energizing elements.

Embodiment 37: The energizing element or seal of embodiment 36, wherein the plurality of energizing elements are stacked upon each other in the axial direction.

Embodiment 38: The energizing element or seal of any of embodiments 1-8, wherein at least one oscillation of the plurality of oscillations has a circular cross-section in the axial direction.

Embodiment 39: The energizing element or seal of any of embodiments 1-8, wherein at least one oscillation of the plurality of oscillations has an oval cross-section in the axial direction.

Embodiment 40: The energizing element or seal of any of embodiments 1-8, wherein at least one oscillation of the plurality of oscillations has a polygonal cross-section in the axial direction.

Embodiment 41: The seal of any of embodiments 5-8, wherein the energizing element provides a radial biasing force against the jacket of between 0.1 N/mm and 1000 N/mm.

Embodiment 42: The seal of any of embodiments 5-8, wherein the energizing element is adapted to provide an outward force in at least one outwardly oriented direction.

Embodiment 43: The seal of any of embodiments 5-8, wherein the energizing element is disposed entirely within the annular recess.

Embodiment 44: The seal of any of embodiments 5-8, wherein the seal is a face seal.

Embodiment 45: The seal of any of embodiments 5-8, wherein the seal is an axial seal.

Embodiment 46: The energizing element or seal of any of embodiments 31-32, wherein the wire provides anisotropic properties when bended in radial compared to linear direction.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. An energizing element comprising: an energizing element body comprising a filament oriented about a central axis, the filament comprising a plurality of oscillations generally directed down the central axis, wherein at least one oscillation comprises an internal circumferential void having a first circumferential width, WFV, and a second circumferential width, Wsv, located at an axial position along the oscillation, and wherein WFV≠Wsv, wherein the filament has a circumferential width, WEE, that is substantially uniform along the energizing element body, wherein the axial position of the first circumferential width, WFV, is axially outward of the axial position of the second circumferential width, Wsv, wherein WFv>1.1Wsv.

2. An energizing element comprising: an energizing element body comprising a filament oriented about a central axis, the filament comprising a plurality of oscillations generally directed down the central axis, wherein the plurality of oscillations comprise an exterior oscillation from a center point having a filament length, LFF, and a circumferentially neighboring interior oscillation from the center point having a filament length, LSF, and wherein LFF≠LSF, wherein the filament has a circumferential width, WEE, that is substantially uniform along the energizing element body, wherein the plurality of oscillations comprises a first oscillation and a second oscillation, wherein the first oscillation has an internal circumferential void having a circumferential width, WFOv, and the second oscillation has internal circumferential void having a circumferential width, Wsov, and WFOV≠WSOV.

3. An energizing element comprising: an energizing element body comprising a filament oriented about a central axis, the filament comprising a plurality of oscillations generally directed down the central axis, wherein the plurality of oscillations comprise a plurality of exterior oscillations from a center point, and a plurality of interior oscillations from the center point, wherein the number of exterior oscillations is greater than the number of interior oscillations such that there are a plurality of exterior oscillations between each neighboring interior oscillation, wherein the filament has a circumferential width, WEE, that is substantially uniform along the energizing element body.

4. The energizing element of claim 2, wherein $L_{FF} \geq 1.1 L_{SF}$.

5. The energizing element of claim 2, wherein $L_{SF} \geq 1.1 L_{FF}$.

6. The energizing element of claim 3, wherein the number of exterior oscillations is greater than two times the number of interior oscillations.

7. The energizing element of claim 3, wherein at least one exterior oscillation is connected to at least one interior oscillation across the center point by an arcuate portion spanning a circumferential distance wider than a circumferential width of the filament.

8. The energizing element of claim 1, wherein the filament defines an angle α in a radial direction between neighboring oscillations, wherein α is between 0-180°.

9. The energizing element of claim 1, wherein the plurality of oscillations has an interior oscillation having an axial apex having a height, $H_{IO}$, and an exterior oscillation having an axial apex having a height, $H_{EO}$, wherein $H_{IO} \geq H_{EO}$.

10. The energizing element of claim 1, wherein the plurality of oscillations has an interior oscillation having an axial apex having a height, $H_{IO}$, and an exterior oscillation having an axial apex having a height, $H_{EO}$, wherein $H_{EO} \geq H_{IO}$.

11. The energizing element of claim 9, wherein at least one of an axial apex of the interior oscillation or the exterior oscillation is generally disposed at a mid-way point of the circumferential width, $W_V$, of an internal circumferential void or external circumferential void.

12. The energizing element of claim 9, wherein at least one of an axial apex of the interior oscillation or the exterior oscillation comprises a circumferential ridge.

13. The energizing element of claim 9, wherein at least one of an axial apex of the interior oscillation or the exterior oscillation is rectilinear.

14. The energizing element of claim 9, wherein at least one of an axial apex of the interior oscillation or the exterior oscillation is rounded.

15. The energizing element of claim 9, wherein at least one of an axial apex of the interior oscillation or the exterior oscillation comprises a plurality of local axial apexes.

16. The energizing element of claim 15, wherein the plurality of local axial apexes are circumferentially spaced apart by a saddle.

17. The energizing element of claim 9, wherein at least one of an axial apex of the interior oscillation or the exterior oscillation comprises an axial apex circumferentially spaced apart by a first axial shoulder and a second axial shoulder.

18. The energizing element of claim 1, wherein the energizing element has a Daub-sectional profile selected from a D-shape, a U-shape, a V-shape, an O-shape, an E-shape, or a C-shape.

19. The energizing element of claim 1, wherein the energizing element comprises a plurality of energizing elements.

\* \* \* \* \*